(12) United States Patent  
Heinen

(10) Patent No.: US 7,533,747 B2  
(45) Date of Patent: May 19, 2009

(54) WHEEL PROVIDED WITH DRIVING MEANS

(75) Inventor: Adrianus Johannes Heinen, Apeldoorn (NL)

(73) Assignee: E-Traction Europe B.V., Apeldoorn (NL)

( * ) Notice: Subject to any disclaimer, the term of this patent is extended or adjusted under 35 U.S.C. 154(b) by 138 days.

(21) Appl. No.: 10/795,803

(22) Filed: Mar. 8, 2004

(65) Prior Publication Data

US 2005/0029026 A1   Feb. 10, 2005

Related U.S. Application Data

(63) Continuation-in-part of application No. 10/619,926, filed on Jul. 15, 2003, now Pat. No. 7,353,896, which is a continuation-in-part of application No. 10/205,405, filed on Jul. 26, 2002, now Pat. No. 7,059,437.

(30) Foreign Application Priority Data

| Jan. 26, 2000 | (NL) | ................................ 1014182 |
| Jan. 26, 2001 | (WO) | .................... PCT/NL01/000540 |
| Mar. 7, 2003 | (NL) | ................................ 1022873 |
| Oct. 17, 2003 | (NL) | ................................ 1024565 |

(51) Int. Cl.  
    B60K 1/00 (2006.01)

(52) U.S. Cl. ..................................................... 180/65.5

(58) Field of Classification Search ............... 180/65.1, 180/65.2, 65.5, 233, 248; 310/67 R, 75 C, 310/75 R, 165  
See application file for complete search history.

(56) References Cited

U.S. PATENT DOCUMENTS

| 4,651,066 A | * | 3/1987 | Gritter et al. ................ 318/139 |
| 5,214,332 A | * | 5/1993 | Tsutsumi ..................... 310/103 |
| 5,327,034 A | | 7/1994 | Couture et al. ............. 310/67 R |
| 5,355,039 A | | 10/1994 | Couture ..................... 310/67 R |
| 5,412,269 A | | 5/1995 | Couture ..................... 310/67 R |
| 5,438,228 A | | 8/1995 | Couture et al. ............. 310/67 R |
| 5,509,492 A | * | 4/1996 | Pfannschmidt ............. 180/65.5 |
| 5,540,296 A | * | 7/1996 | Strothmann ................ 180/19.3 |
| 5,549,172 A | * | 8/1996 | Mutoh et al. ............... 180/65.1 |
| 5,677,582 A | | 10/1997 | Lutz et al. .................. 310/75 R |
| 6,732,824 B2 | * | 5/2004 | Sugata ........................ 180/65.5 |

FOREIGN PATENT DOCUMENTS

| DE | 38 17 537 A | | 12/1988 |
| DE | 0413337 | * | 2/1991 |
| DE | 93 11 489 | | 10/1993 |
| DE | 44 34 237 A | | 3/1996 |
| EP | 0 445 845 | | 9/1991 |
| EP | 0 588 478 A | | 3/1994 |
| EP | 0 931 684 A | | 7/1999 |
| GB | 643579 | | 9/1950 |
| JP | 06245447 | | 9/1994 |
| NL | 1 014 182 C | | 7/2001 |
| WO | WO 01/54939 A | | 8/2001 |

* cited by examiner

Primary Examiner—Christopher P Ellis  
Assistant Examiner—Bridget Avery  
(74) Attorney, Agent, or Firm—Morgan, Lewis & Bockius

(57) ABSTRACT

A traction assembly includes a wheel with a wheel shaft and traction means which, when in operation, exert torque on the wheel shaft. The traction assembly further includes a first electromotor coupled to a second electromotor, housings, stators, rotors, controllers, at least one operating means connected to a controller, at least one measurement tool and at least one data communication means.

8 Claims, 9 Drawing Sheets

WHEEL PROVIDED WITH DRIVING MEANS

CROSS-REFERENCE TO RELATED APPLICATIONS

The present application is a continuation-in-part of U.S. patent application Ser. No. 10/619,926, filed Jul. 15, 2003 now U.S. Pat. No. 7,353,896, entitled "Wheel Provided With Driving Means," which is a continuation-in-part of U.S. patent application Ser. No. 10/205,405, filed Jul. 26, 2002 now U.S. Pat. No. 7,059,437, entitled "Wheel Provided With Driving Means," which claimed foreign priority based on International Patent Application No. PCT/NL01/00054 filed Jan. 26, 2001, which in turn claimed priority based on Dutch Patent Application No. NL 1014182, filed Jan. 26, 2000. The present application also claims foreign priority based on Dutch Patent Application No. NL 1022873, filed Mar. 7, 2003 and Dutch Patent Application No. NL 1024565, filed Oct. 17, 2003.

FIELD OF THE INVENTION

The invention relates to a traction assembly comprising a wheel and traction means, a vehicle provided with at least one such traction assembly, and a new electric motor.

BACKGROUND OF THE INVENTION

It is common practice to drive a wheel with traction means such as a combustion engine, a (jet) turbine or for example an electric motor. The drive is connected to the wheel by means of a reduction gear, usually a gearbox having an acceleration, or a V-belt or the like.

In the parent application to the present case (U.S. Ser. No. 10/205,405), an electric motor is mounted into a wheel.

It is an object of the invention to realise a traction system having an improved efficiency and more versatile application possibilities.

To that end the invention provides a traction assembly comprising a wheel comprising a wheel rotational axis and a traction means comprising an electric motor which, when in operation, exerts a torque on the wheel, wherein the traction ratio, being the arm of the torque divided by the radius of the diameter of the wheel, is larger than 0.57.

By choosing such a ratio of the arm relative to the diameter of the wheel it is possible, on the one hand to create a workable situation in which way a practical vehicle can be made, and on the other side to achieve optimum efficiency.

Tests and research with regard to the electric motor within the wheel as described in the aforementioned parent application, led to the discovery and the insight that the efficiency with respect to the embodiment described in the parent application could still be further improved when the arm of the torque is as close as possible to the diameter of the wheel.

Furthermore, side effects appeared to occur, which drastically reduced the net losses of other energy-using components. Due to the efficiency improvement an engine with smaller a capacity than expected could be deployed for traction. As a result the required battery capacity could also be reduced. In addition, several components, such as the battery charger and the other electronics, could be reduced in size and/or weight. As a result the required engine capacity could yet again be further reduced. Finally a considerably more efficient traction than could theoretically be calculated, appeared possible.

As a result energy efficiency improvements could be realised that went well beyond what until then had been calculated and known.

The arm has been determined here by the distance between the centre of the drive shaft or rotor and the line of action of the force exerted by the traction means on the drive shaft or rotor to rotate the drive shaft or rotor.

A traction device according to the invention as to structure can very well be realised when using an electric motor.

When applying for example an electric motor provided with a stator having windings and a rotor mounted around it having permanent magnets (a so-called: "buitenloper"), wherein the stator is stationary and connected to a vehicle and the rotor having the permanent magnets revolves around the stator and is connected to the wheel shaft and the wheel, the arm will be half the inner diameter of the rotor, i.e. the inner radius of the rotor. Such a configuration makes it possible to realise a traction device according to the invention, with a surprisingly high efficiency.

The electric motor may also comprise windings that are mounted on a drive shaft like a rotor and the permanent magnets may be statically mounted outside the stator. In this case, the arm is half the diameter of the rotor. Variations on these concepts are possible.

In one embodiment in which the traction means comprise an electric motor, the stator will include the windings and the rotor will include the permanent magnets. This eliminates the need for complex supply of electric power, and the construction of the electric motor can be simple. Furthermore, the connection to or inclusion in a vehicle can be simple. Once again a "binnenloper", where the rotor revolves within the windings, as well as a "buitenloper", where the rotor revolves around the windings, could be chosen. The "buitenloper" is preferred to be able to realise the largest possible traction ratio.

In an embodiment the wheel is provided with a tyre, preferably a pneumatic tyre. In that case, the radius of the wheel also includes the thickness of the tyre. For a vehicle provided with a tyre, the choice for a traction assembly according to the invention is even less obvious.

In a further embodiment, for the sake of a simple assembly, the traction means have been mounted by means of connection means, which permit an angle between the wheel shaft and the drive shaft of the traction means. Examples of such connection means are a cardan transmission and a so-called "homokineet", a type of axis provided with a joint, or similar means.

In an embodiment the windings have been statically connected to the vehicle, and permanent magnets have been arranged around the windings and connected to the drive shaft. This makes a simple construction possible, because the supply of electric power is simple. In addition the rotor on which the magnets are mounted can be designed using lightweight materials.

In an embodiment of the traction assembly, according to the invention, the traction ratio is larger than 0.65. With a proper choice of the traction means this ratio appeared feasible. In a further embodiment the traction ratio is larger than 0.7. In this case, high demands will be placed on the design of the traction means.

In an embodiment the traction ratio is smaller than 1.0, preferably smaller than 0.95. In this case, a good selection needs to be made of the material and type of wheels. Applying pneumatic tyres for instance will necessitate extraordinary types and models of pneumatic tyres.

In an embodiment of the traction assembly according to the invention, the traction means comprise an electric motor.

Experience has shown that an electric motor is particularly suited for use in a traction assembly according to the invention. For instance an electric motor has high torque at low revolutions. Furthermore, because of a careful design it will be possible to realise a traction complying with the demands made by the invention on the traction ratio.

In a further embodiment the electric motor is a synchronous motor provided with permanent magnets. This simplifies the design of the motor. Moreover, using permanent magnets further allows a sufficiently compact construction of the motor.

In an embodiment of the traction assembly, according to the invention, in which the traction means are an electric motor, said electric motor comprises a stator provided with windings, which with respect to a vehicle are statically arranged in the vehicle, and a rotor provided with permanent magnets. The electric motor can thus be built sufficiently compact to be used in the invention.

In an embodiment the traction means comprise operating and control means for the operation of the electric motor within the stator and preferably against the stator.

In a further embodiment the rotor is arranged coaxially around the stator and connected to a drive shaft of the electric motor ("buitenloper").

In an embodiment the traction means are mounted adjacent to the wheel.

In an embodiment the traction means comprise a drive shaft, and the drive shaft and the wheel shaft are situated in line and in each other's extension.

In an embodiment the drive shaft and the wheel shaft are connected for direct traction.

In an embodiment in which the traction means comprise a drive shaft, the drive shaft directly drives the wheel shaft. In a particular embodiment of this, the drive shaft is the wheel shaft.

In an embodiment of the traction assembly, in which the traction means are an electric motor provided with permanent magnets, the permanent magnets are connected to the wheel shaft.

The wheel shaft and the drive shaft may possibly be connected by means of a connection that permits the longitudinal axis of the wheel shaft and the longitudinal axis of the drive shaft to be at an angle that does not equal 180°. A cardan transmission and use of a so-called "homokineet", a type of axis which is provided with a joint, are examples of such a connection.

In an embodiment the efficiency, and in particular the energy consumption, of a vehicle comprising such a traction assembly according to the invention or described above can be improved even further, when the traction means or driving means comprise an electric motor which is adapted to provide a maximum nominal or rated torque of at least 0.3 Nm/kg of vehicle mass. Even better efficiency is possible if the maximum nominal or rated torque is at least 0.4 Nm/kg of vehicle mass. This torque is the maximum rated torque. An electric motor can provide, during a short period of time, usually not more than several minutes, up to twice this maximum rated torque. It was discovered that this seemingly large over dimensioning provides a large efficiency advantage, especially in combination with the traction ratio.

Another aspect of the invention regards a traction assembly for a vehicle, comprising a wheel provided with a wheel shaft, and an electric motor comprising a drive shaft, a rotor and a stator, in which the drive shaft is connected to the wheel shaft for direct traction and the electric motor is arranged adjacent to the wheel.

Surprisingly energy efficient traction is thus made possible.

In an embodiment the wheel shaft and the drive shaft are arranged in line. In addition other embodiments as mentioned above are possible.

The invention further relates to a wheel provided with electric driving means in the wheel as well as a method for coordinating the number of revolutions of at least two of such wheels attached to one vehicle.

From the literature wheels provided with electric driving means in the wheel are known. In particular wheels are known that are provided with electro motors in the wheel. Examples of such wheels can for instance be found in DE-A-2719736, DE-A-4404889, FR-A-2561593, U.S. Pat. No. 4,585,085 and WO-A-95/16300.

One of the problems occurring in the known wheels is the coordination between wheels when more than one driven wheel is used in one vehicle.

Another problem occurring in the known wheels provided with driving means is that control means are necessary. Such control means are arranged outside the wheel in a vehicle. This renders the building of an electronically driven vehicle a complex megatronic venture. WO-A-95/16300 tries to solve this by arranging a part of the control electronics within the wheel. Using several such driven wheels in one vehicle is not possible however.

It is an object of the invention to provide an electrically driven wheel of high efficiency.

An additional object of the invention is to provide a wheel that is easy to mount.

Additionally it is an object to develop a wheel that offers freedom of design of a vehicle.

Another object is a wheel that is simple to replace and demount.

Another object is offering a wheel provided with driving means which in cooperation with other similar wheels can be deployed in one vehicle.

Said problems are at least partially solved and at least a part of the advantages achieved by means of the wheel according to the invention.

To that end the invention relates to a wheel provided with electric driving means in the wheel, control, measuring and operating means in the wheel for operating the electric driving means and data communication means in the wheel.

The current invention can use the motor and all of its components inside the motor described in this description also as a motor which is located outside the wheel, but directly driving an axis of a wheel.

Additionally the invention relates to a method for coordinating the number of revolutions of at least two wheels provided with electro motors in the wheels and further provided with control, measuring and operating means in the wheels for operating the electric driving means and with data communication means in the wheels, in which physically separated control systems control the amperage in each winding of the electro motors, the control systems in one wheel are operated by an operating system, a measuring system supplies information regarding the magnetic field strength to the control system and supplies the mutual position of the rotor and stator to the operating system, and the operating systems of the several wheels communicate with each other by means of data communication means via a central processing unit.

In an embodiment, the communication means comprises means for establishing and maintaining a computer network. This computer network may comprise two or more wheels according to the present invention, but also one or more computers outside the wheels. Such a computer network may comprise a LAN, WAN, of even the internet. The connection can be made via copper, glassfiber, wireless (i.e., IR, optically, bluetooth, or any other means).

Because of the wheel according to the invention a driving concept has been realised that is efficient, simple to mount and can be integrated in a vehicle.

Because of the method according to the invention it is possible to use several wheels provided with electric drive in one vehicle.

Preferably the wheel comprises a rim which coaxially at the inner side is provided with a rotor with permanent magnets. The rotor and rim are connected to a central shaft, and a coaxial stator is provided with windings. The stator is situated between the central shaft and the rotor and being connectable to a vehicle. In that way the wheel is provided with an electro motor. As a result a simple drive of the wheel is possible. Moreover no transmission is needed, particularly no reducing transmission, in which great power losses have appeared to occur.

More specifically the stator is divided into at least two groups of electrically and physically separated windings and each group comprises at least two windings each having its own control and measuring system, which control and measuring systems are situated in the wheel and the control and measuring systems are operated by an operating system which is also situated in the wheel. As a result a driving system is created that is integrated in a wheel, in which the driving system is very robust and not very sensitive to malfunctioning.

The wheel according to the invention more preferably comprises means for exchanging data with the control, measuring and operating system of other, similar wheels. As a result it is possible to couple several wheels according to the invention to one vehicle, because of which a powerful propulsion of the vehicle can be realised. In order to make the data communication less sensitive to malfunctioning, the means for exchanging data to the outside preferably are optical communication means.

In order to let either several wheels or one wheel according to the invention communicate with other equipment outside of the wheel, the measuring, control and operating systems of a wheel communicate via a central processing unit outside the wheel. In this way for instance several wheels of one vehicle are able to communicate with each other.

In order to further reduce the sensitivity to malfunctioning of a wheel even more, the control system comprises means for controlling the strength of electric current through each winding separately. In this case a winding also means a coil. When a current runs through the coil or winding this results in a magnetic field.

The control systems of the windings are connected to the operating system. Said operating system is hierarchically above the control systems and orders each control system to set and maintain a certain strength of electric current.

The wheel according to the invention is also provided with measuring systems, in which the measuring systems comprise an encoder for measuring the number of revolutions and the angular position of the rotor with respect to the stator, and a current measuring device for measuring the current through each of the windings. As a result the current through each winding can be accurately set and calibrated. Additionally the operating system is able to operate the winding well, and set the phase on each winding for an optimal working of the electric drive. Additionally the measuring system is provided with means for measuring the mechanical torque, preferably by means of strain gauges that are able to measure the strain in material accurate to the nanometer. Such means for measuring strain or torsion, deformation in metal in general, as such are known. A comparison of mechanical resulting torque and accommodated motor power provides an idea of the condition of the wheel.

The encoder preferably is connected to the operating system and the control systems are connected to the current measuring devices. As a result a modular system is created that is not very prone to malfunctioning.

The operating system is connected to a central processing unit outside the wheel by means of the data communication means. As a result the coordination with other systems in a vehicle is possible.

In order to cool the driving means in case of an all to great development of heat, the wheel is provided with cooling means, and if so desired also with active cooling means, such as fans 616. Additionally the wheel may be provided with means for water cooling.

In order to render cooperation of several wheels according to the invention in one vehicle possible, the operating systems in the wheel preferably are provided with a "master" setting and a "slave" setting, in which by means of the communication means the central processing unit is able to have the operating system switch from the "master" setting to the "slave" setting and vice versa. For instance when taking bends either the power demand or the speed of several wheels will vary. In order to make coordination of one with the other possible, the switch from the "master" setting to the "slave" setting and vice versa is influenced by either the power demand or the speed of the wheel. It is preferred here that the wheel demanding the lowest power, i.e. the wheel having the highest speed of revolution, has been set as "master".

In the method according to the invention it is preferred that the central processing unit has the operating system of the wheel demanding the lowest power function as "master", and has the operating systems of the other wheel or other wheels, respectively, operate as so-called "slave". In one embodiment, the master-slave settings may change dynamically during operation of the vehicle, i.e., each time the wheel demanding the lowest power becomes the master, the other wheel(s) will become the slave unit(s). Thus, the master and slave settings can change from wheel to wheel during operation of the vehicle. As a result the driving system is easy to implement and control.

In order to anticipate future situations during driving well, it is preferred that the central processing unit includes data of the wheel struts regarding the angular position when managing the operating systems of the wheels.

The invention further relates to an assembly of at least two wheels according to the invention that are connected to a common central data processing unit by means of data communication means.

The invention further relates to a vehicle wheel having an electro motor in it, in which the electro motor is a more than 8 pole, 3 or more phased, DC synchronous motor.

Additionally the invention relates to a wheel provided with a housing mounted at a rotatable shaft, at the outside provided with a rim with tyre and at the inside provided with permanent magnets, and a housing mountable at a vehicle, rotatably connected to the shaft, provided with control, measuring and operating means and electric means for generating a magnetic field. Because of such a structure the wheel is simple to replace and can be mounted in a modular manner. Additionally a mechanical brake system is easy to mount on the shaft as an extra safety provision.

Additionally the invention relates to a wheel provided with electric driving means in the wheel, means for measuring the mechanically delivered torque, means for measuring the torque by measuring the electrically accommodated power and means for comparing the mechanically delivered torque and the measured electric power. As a result it has appeared possible to detect premature wear and malfunctions in the wheel, even before an actual defect occurs. By means of the communication means a (future) defect can be established even at a distance and possibly be remedied.

Additionally the invention relates to a wheel provided with electric driving means in the wheel, provided with at least two galvanically separated motor windings, at least two galvanically separated power modules and at least two galvanically separated operating units for the power modules.

The invention moreover relates to a wheel strut provided with vehicle attachment means for attaching the wheel strut to a vehicle, and wheel attachment means for attaching a wheel to the wheel strut, in which the wheel attachment means are rotatable about the longitudinal axis with respect to the vehicle attachment means and in which the wheel strut is provided with driving means for rotating the wheel attachment means with respect to the vehicle attachment means.

As a result such a wheel strut is easy to mount on a vehicle, and other means such as a steering means for the vehicle and drive for wheels can easily be coupled.

Preferably the vehicle attachment means and the wheel attachment means are spring-mounted to each other along the longitudinal axis by means of connection means.

Preferably the connection means comprise a splined shaft which at one side is provided with a spline and on the other side is provided with driving means for rotating the splined shaft, and with a spline housing in which the splined shaft is situated and which spline housing at the bottom side is provided with accommodation means for a wheel shaft and attachment means for a wheel, and in which the vehicle attachment means are formed by a sleeve provided with means to connect the sleeve to a vehicle, in which the spline housing with splined shaft is at least partially accommodated in the sleeve, in which the spline housing and the sleeve are spring-mounted to each other by means of spring means, and the driving means are connected to the sleeve.

The structure that can be realised in this way is simple, robust, and can be integrated well in and with existing vehicles and production methods.

In order to attach a wheel the spline housing is provided with a receiving sleeve for a shaft which is positioned substantially perpendicular to the spline housing. As a result it is possible to attach a wheel stably and securely.

Additionally the wheel strut comprises spring means for buffing the vertical movement of the wheel attachment means with respect to the vehicle attachment means.

Preferably the wheel strut is provided with means for communicating with the driving means.

Preferably the wheel strut is provided with means for communication with the operating means of a wheel according to the above-mentioned first aspect of the invention. Preferably the driving means of the wheel strut communicate with the operating means of a wheel according to the invention by means of the central processing unit.

Said aspects of the invention can, if so desired, be combined. For instance a vehicle can be equipped with 2 or 4 wheel struts according to one aspect of the invention, and 4 or more wheels according to the invention. It is also possible for instance that a fork-lift truck is equipped with only one or two wheels according to the invention, but also with two wheel struts according to the invention.

As a result of a high degree of automation the wheel strut and the wheel according to the invention are particularly suitable for use in fully automatically guided vehicles. Operation can also take place by means of a joystick and so-called drive-by-wire, in which the signals of for instance a joystick or steering wheel are converted into (electric or optic) steering signals.

The invention furthermore relates to a particular electromotor, and a vehicle which is driven in a particular way using an electromotor.

In practice electromotors are known in various embodiments. A problem with the known electromotors is that the quantity of torque provided often is difficult to set. In addition the operation of several electromotors often is difficult to adapt to each other. Moreover it is hard to adapt the provided torque of an electromotor to the desired application and to dimension the electromotor such that is can be used for various applications.

It is an object of the invention to at least partially overcome the said drawbacks.

It is a further object of the invention to provide an electromotor that is universally applicable and easy to scale up and deploy, for instance in a vehicle.

It is a further object of the invention to provide an improved vehicle having an advantageous fuel consumption.

To that end the invention provides an electromotor comprising a housing provided with:
 a stator connected to the housing and comprising at least two groups of physically separated windings;
 a rotor, coaxially and rotatably mounted within the stator and comprising permanent magnets;
 control means for controlling the electric current in the windings;
 measuring means for measuring the current and the phase thereof through the windings and the angular position of the rotor with respect to the stator;
 operating means connected to the control means and the measuring means for operating the electromotor, and
 data communication means, connected to the operating means, for communicating data to outside the housing.

The invention further relates to a vehicle provided with a wheel having a wheel shaft having an axis of rotation and a electromotor provided with a rotor having an electromotor axis of rotation, wherein the electromotor is placed in the vehicle with its axis of rotation mounted above the axis of rotation of the wheel.

By opting for an electromotor according to the invention an electromotor is obtained having an adjustable torque. Moreover it is possible to connect several motors to each other. To that end among others the housing is provided with attachment means.

The placing of the motor in the vehicle makes it possible to make a vehicle having an advantageous ratio between the diameter of the air slit (i.e., the space between the magnet and the windings) and the diameter of the wheel. As a result an energy-efficient vehicle can be developed. Especially in combination with the motor according to the first aspect of the invention, a vehicle having advantageous properties can be developed.

In an embodiment of the electromotor according to this aspect of the invention, the measuring means comprise at least two means for measuring a magnetic field, arranged between two permanent magnets.

In another further embodiment, both ends of the rotor comprise attachment means for a driving shaft.

In a further embodiment one of the attachment means comprises a bush in which a shaft end can be operationally connected to the rotor.

In another or further embodiment, the operating means have a so-called master and slave setting, wherein the operating means can be converted from a so-called master into slave setting, and vice versa, influenced by either the demand for power, the speed of rotation of the rotor or via the data communication means.

In an embodiment, the other attachment end is provided with a homokinete.

In an embodiment, at least two electromotors according this aspect of the invention are assembled together, wherein one electromotor is set as so-called master and the other one or ones as so-called slave, and wherein the data communication means are connected one to the other or others to each exchange data with each other.

In an embodiment of the vehicle, the electromotor axis of rotation is substantially parallel to the axis of rotation of the wheel.

In another embodiment of the vehicle, the rotor is connected to the wheel shaft by means of one or more homokinetes.

The invention additionally relates to a computer provided with software for the operation of one or several wheels as described, and/or for the operation of the wheel strut. Additionally the invention relates to a data carrier provided with such software.

BRIEF DESCRIPTION OF THE DRAWINGS

A number of specific embodiments of the invention will be elucidated on the basis of the figures. The figures serve to illustrate the invention. The invention, however, is not limited to the specific embodiments shown.

DETAILED DESCRIPTION OF THE PREFERRED EMBODIMENTS

Figure 1:
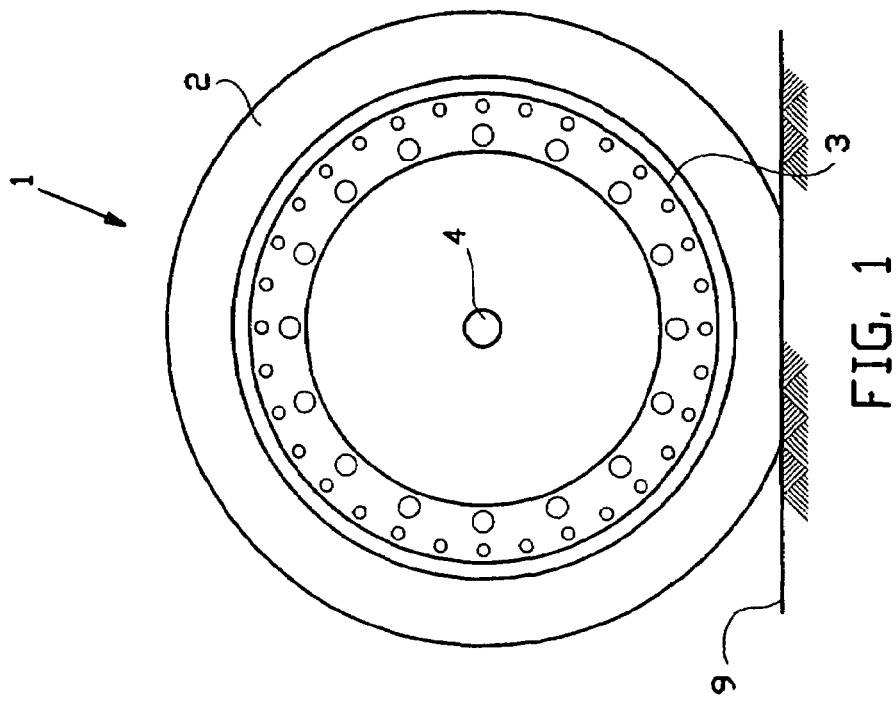
FIG. 1 shows a side view of a wheel having a traction unit according to the invention.

FIG. 1 shows a side view of a directly driven wheel 1 according to the invention. A tyre 2 is mounted on a rim 3, which is connected to a wheel shaft 4. The wheel itself has an outer diameter of D1.

An electric motor 5 is mounted here on the wheel shaft 4, wherein the drive shaft 8 is connected to the wheel shaft 4. In the embodiment shown, the drive shaft and the wheel shaft are formed from one unit.

The electric motor is a so-called synchronous motor, provided with a rotor 6 having permanent magnets 10 within which the stator has windings 7. The permanent magnets 10 are connected through the rotor 6 with the drive shaft 8, the windings 7 are stationary and connected with respect to the vehicle to form the stator, and the rotor 6 revolves around the stator. In this way a simple, lightweight and reliable construction is achieved, which enables the realisation of the traction device according to the invention in a simple manner.

The windings can also be connected to the drive shaft and the permanent magnets can be stationary with a vehicle. In addition it is possible of course to mount the permanent magnets within the windings and/or to mount the permanent magnets or the windings in a stationary manner.

The forces in the electric motor as shown in FIG. 1 engage at a distance of D2/2 from the centre of the drive shaft 8. D2 is the inner-diameter of the rotor. This means that the arm of the moment generated by the electric motor is D2/2.

In one embodiment of the invention, D2/D1>0.57. It has been proven that the closer D2 approximates D1, the higher the efficiency will be, and the larger the side effect of ever reducing energy losses.

Figure 2:
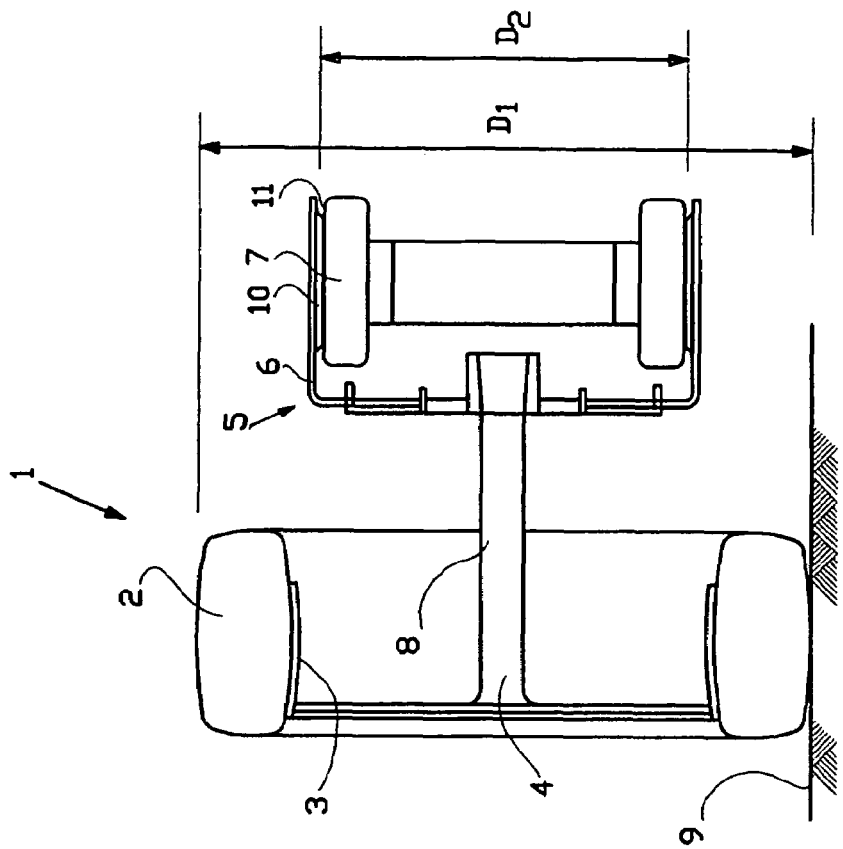
FIG. 2 shows a cross-section of a side view of the wheel of FIG. 1.

FIG. 2 shows a cross-section of a side view of the wheel of FIG. 1. The side view shows the air-gap 11 between the permanent magnets 10 and the windings 7. For consistency of the invention, the diameter of the electric motor is presented as D2. This diameter is the inner-diameter of the rotor.

In another embodiment that includes the thickness of the pneumatic tyre, which is preferred in road transportation of people and goods, and the diameter of the electric motor preferably satisfies the following relationship: 0.65<D2/D1<1.

As to construction, the electric motor preferably is almost identical to the electric motor described in WO A1 01/54939, which is hereby incorporated herein in its entirety by reference. As described in said patent application, it is also possible that various driven wheels in one vehicle cooperate.

The wheel with tyre 2 runs on a surface 9.

Figure 3:
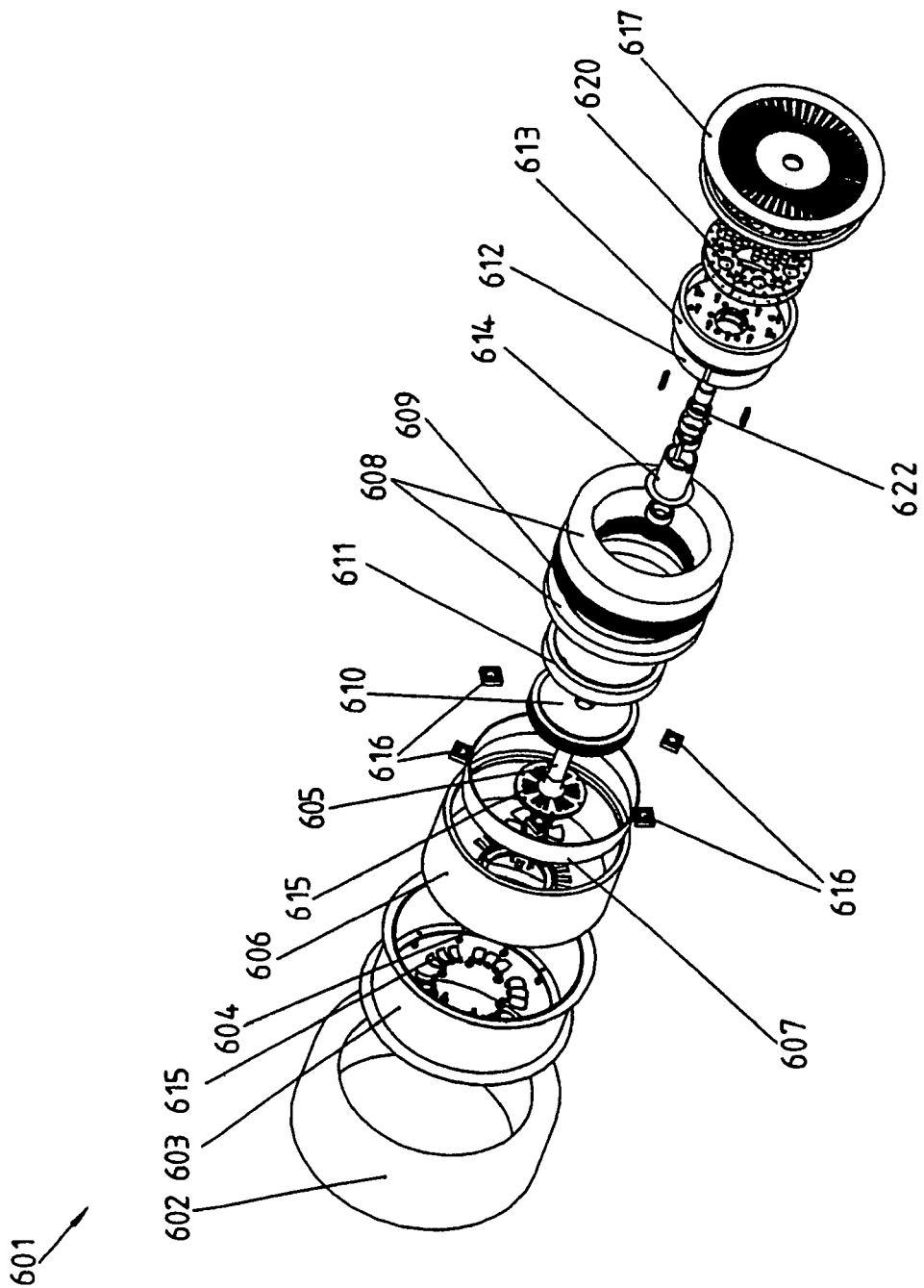
FIG. 3 shows a wheel according to the invention.

FIG. 3 shows an embodiment of a wheel 601. In FIG. 3, the wheel is provided with a tyre 602, which can be used in several embodiments. The motor described below, however, can also be used outside the wheel for directly driving a wheel as shown on FIG. 2.

The tyre may for instance be a full rubber tyre for use in low speed vehicles such as tractors, fork lift trucks or other types of vehicles for cargo transport. The wheel diameter will preferably be approximately 800 mm. The tyre may also be designed as an air pressure type for use in medium speed vehicles such as for instance city taxis and medium heavy cargo transport in urban areas. In order to obtain an optimal effect according to the present invention, the distance between the tread and the bead of the tyre should be as small as possible.

The tyre 602 is mounted on rim 603, which is adapted to the various types of tires. A lid 604 has been mounted to the rim 603, which connects the rim to the central shaft 605.

At the inside of the rim 603 the rotor 606 is attached on which at the inside the permanent magnets 607 have been glued. Said permanent magnets 607 rotate along with the rim 603. The rim 603 with the tyre 602, the rotor 606 with the permanent magnets on it and the other parts attached to the rim, the lid 604 and the central shaft 605 are the rotating parts of the wheel.

Within the permanent magnets 607 an iron package 608 with windings 609 has been accommodated, with an air gap between the iron package 608 with the windings and the permanent magnets 607.

The iron package 608 with the windings 609 is mounted on the central carrier member 611 and mounted on cover plate 617 by means of clamping members 610 and 613. Said cover plate 617 has been provided with a mounting flange (not shown, preferably a B5 flange of the 250 mm type) with which the wheel 601 is mounted to a vehicle. The clamping member 613 is provided with an accommodation space. The control electronics 620, amongst others consisting of IGBT's for current control and programmable logical modules for the operating system, have been accommodated in the space. The iron package 608, the windings 609, the clamping members, and the electronics are fixedly attached to a vehicle by means of said flange and therefore are not rotating parts.

The central shaft 605 is provided with a hardmetal mounting bush 614 on which the bearings 623 of the wheel run. About the central shaft 605 the encoders 621 have also been mounted for measuring in what position the rotor 606 is situated with regard to the windings 609. As a result the operating and control electronics 620 are able to control the exact phase of the voltage on each winding 609 at any moment, so that said phases are optimally adjusted to the position of the permanent magnets 607 with regard to each of the windings 609.

In the figure lid 604 is provided with blades 615. One ring of the blades 615 has been mounted directly about the central shaft, a second ring of blades 615 concentrically about the first ring of blades 615. The blades 615 are open towards the most general direction of rotation (clock-wise as seen from the vehicle side) of the wheel 601. Said blades serve to guide air into the motor for cooling. The blades 615 about the central shaft with the air inlet openings are mounted opposite to the blades 615. When driving the vehicle, to which the wheel 601 has been mounted, the blades 615 will guide air into the wheel 601, and blades 615 suck air out of the wheel. As a result an air flow to the inside will be created, which flows over a cooling body on the outer clamping member 610.

The blades function according to the principle of the centrifugal pump. The number of blades 615 about the central shaft is smaller than the number of blades 615 in order to give the air expanded through heating more space and to be able to discharge it more easily.

In addition to the passive cooling by means of the blades, fans 616 for active cooling may be present in the wheel 601. Said fans may for instance be activated when the internal temperature exceeds a certain value.

The various internal parts of the wheel may, because of the nature of the structure according to the invention, be sealed off liquid proof in a simple manner. As a result it is possible that in addition to the passive cooling by means of blades and the active cooling by means of the fans 616, the inside of the wheel is cooled by means of liquid cooling. The cover plate 617 in any case seals off the operating and control electronics 620 from the outside world.

The rotor 606 can be made of aluminium and of steel, depending on the speed and bearing power needed.

The rotor 606 is the carrier of the permanent magnets 607, which ensure the torque transmission. They also ensure the guidance of the flux, which is necessary to have the magnets act as effectively as possible and thus create a magnetic connection with the magnetic field which is generated in the stator. The stator is formed by the iron package 608 with windings 609.

Apart from the air cooling in the motor, heat can also be discharged by means of cooling ribs 624. In the production stage they are integrated in a casting with the cover plate 617.

For the internal cooling of the electronics 620 a cooling body is provided. Said cooling body of course serves to cool the electronics but also has two additional functions, namely fixation of the stator and sealing off of the water cooling which can be used in larger power and higher voltages. In the figure the cooling body is still separated from the clamping member, but in series production this can become a one-part structure.

Clamping member 610 together with the clamping member 613 of the electronics 620 ensures that the iron package 608 of the stator gets clamped and thus cannot possibly slide in an axial direction with respect to the rotor 606. As a result the magnets 607 remain exactly in their places with respect to the rotor 606 for optimal efficiency.

The stator with windings 609 in FIG. 3 consists of 3 parts, but preferably the iron package of the stator will be made of one part. The windings 609 have been arranged around winding heads, which windings are wound according to a fixed pattern so that an optimal driving behaviour of the wheel 601 according to the invention is achieved. Electric currents run through the windings 609, which currents generate the magnetic forces that are needed to let the rotor 606 rotate. The iron package 608 ensures an optimal guidance of the flux. A well-chosen iron package 608 guarantees a high efficiency of the wheel according to the invention.

A sealing ring ensures the separation between the internal part of the air cooling and that part where the bearing of the wheel according to the invention and the electronics is housed.

Furthermore a mounting bush 614 has been arranged as a support for the bearing (2 double-row angle contact bearings). Said mounting bush 614 has been designed in a high quality type of steel. The steel mounting bush 614 transfers the forces from the bearings on the central carrying member 611 and prevents the rolling out of the central carrying member 611 by the bearings. The bearings ensure the absorption of both the axial and radial forces and namely equally, so that during bends and irregularities in the road surface a stable rotation of the rotor 606 is obtained. Said stable rotation is very important because for an efficient working of the wheel according to the invention an air gap of approximately 2 mm at a maximum preferably is present between the rotor 606 and the stator. The bearings are over-dimensioned in order to ensure said air gap during a large number of operation hours (10,000 hours at a minimum).

Splines have been arranged between the stator and the central carrying member 611 so that said two members cannot possibly rotate with respect to each other.

A retaining ring is pressed by the cover plate 617 and in this way locks the bearings, which in turn fixate the stator with respect to the shaft. In this way it is guaranteed that rotor 606 and stator remain in the same position with respect to each other.

A retaining sleeve keeps the hollow shaft encoder in its place and also ensures that the inner ring of the bearings is confined. The retaining sleeve in turn is fixated on the central shaft 605 by a nut and screw thread.

The central carrying member 611 supports the stator and is blocked against rotation by means of 3 spline connections which are divided over the circumference in a regular pattern. In the carrying member 611 recesses have been arranged in the surface as a result of which during mounting openings are created through which cooling liquid can be transported. Said cooling may be necessary for higher voltages than 96V and larger capacities than 12 kW.

The clamping member 613 has a number of functions.
A: Together with clamping member 610 it clamps the central carrying member 611 and the iron package 608, as a result of which the stator is entirely confined.
B: It closes off the recesses that are meant to let the cooling liquid pass through.
C: It forms an accommodation space or bowl in which the electronics are housed.

Said accommodation space in turn is closed off by the cover plate 617. As a result the electronics 620 are completely sealed off from the outside air, which guarantees a failure free working of the wheel according to the invention.

The ring bearing ensures additional support of the rotor 606, so that the air gap is guaranteed at all times.

During mounting, the cover plate 617 ensures correct connection, sealing, and confinement of the entire structure. This is also the attachment plate for the mounting of the wheel according to the invention to a vehicle or a chassis and preferably is provided with a norm flange B5 of the 250 mm type, as a result of which the wheel can simply be fit in the existing concepts. By means of the cooling ribs 624 extra heat is discharged during driving.

The permanent magnets 607 are manufactured in such a shape that they precisely fit into the rotor 606. After gluing at the inside of the rim of the wheel the magnets form one unit together with the rotor. The magnets preferably are rare earth magnets. Preferably the permanent magnets have a magnetic field strength larger than approximately 1 Tesla.

The encoder for hollow shaft 621 ensures that the way covered can be measured, and also drives the electronics 620, so that a computer or central processing unit knows in which position the rotor 606 is situated with respect to the stator. This is of utmost importance for a shock free rotation of the rotor.

The electronics and logic for operating the wheel, as well as the power electronics has been arranged within the wheel according to the invention. As a result it has become possible to achieve a number of advantages.

One of the largest problems encountered at the moment by manufacturers of electronically driven vehicles, is that all sorts of components are spread over the vehicle that later on have to be connected to each other again. As a result the manufacturing of electronic vehicles is a time-consuming activity and therefore costly as well. Additionally the production often takes place in three consecutive stages as a result of which the production time is relatively long.

Figure 4:
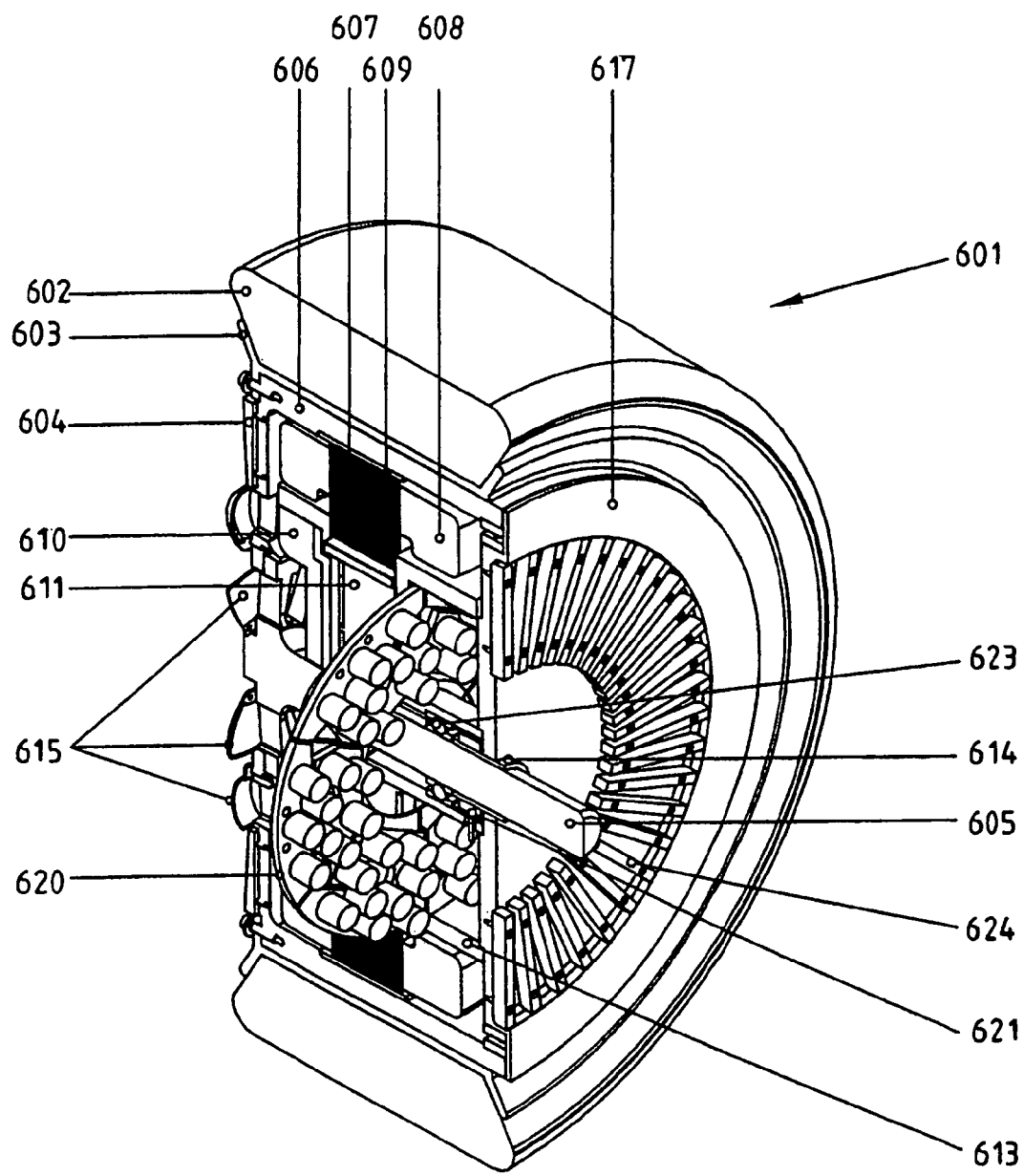
FIG. 4 shows the wheel of FIG. 1 in cross-section.

FIG. 4 shows the wheel according to FIG. 3 in cross-section, as a result of which special aspects of the embodiment of a wheel according to the invention shown in FIG. 3 are further elucidated. The reference numbers here have the same meaning as in FIG. 3. In the cross-section it can clearly be seen how the rim 602, rotor 606, permanent magnets 607 and the central shaft 605 are connected to each other by means of lid 604. Furthermore it can clearly be seen how the windings 609 and the iron package 608 (the stator), and the clamping members 610, 613 with the electronics 620 are connected to the cover plate 617. In the cross-section it can clearly be seen as a result, how the electric driving means, in this case the electro motor, are situated in the wheel 601. By placing an electro motor in such a way it has appeared possible to achieve very high efficiency, up to 50% higher than in the usual electrically driven vehicles. In particular an electro motor as described in the FIGS. 1 and 2 results in a great advantage. For instance, the motor having permanent magnets is capable of generating electricity itself when in neutral, because the motor acts as a dynamo. Because of the mounting of the motor in the wheel it is not necessary any more either to use a transmission or a differential. The number of revolutions of the motor need not be high either.

Figure 5:
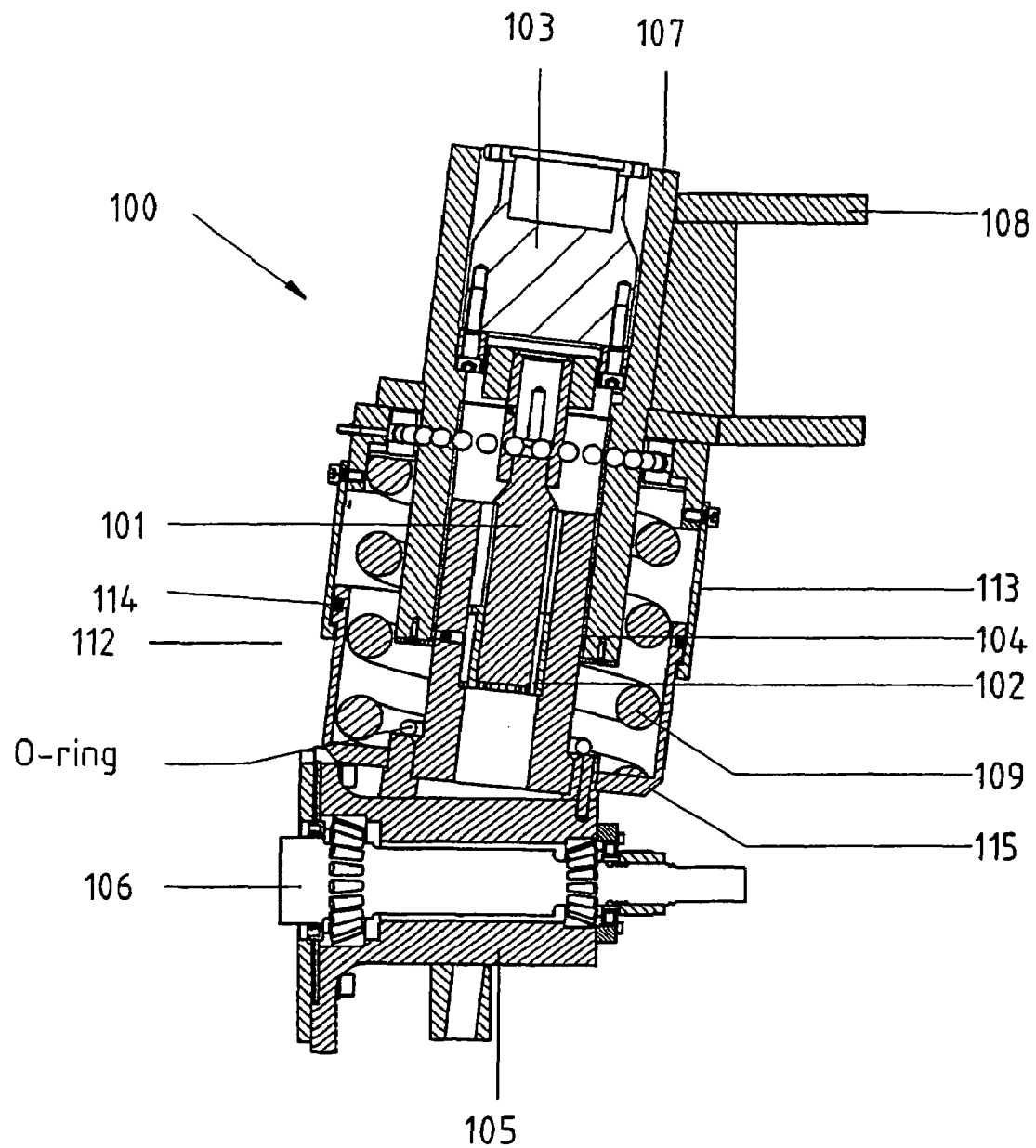
FIG. 5 shows a cross-section of a wheel strut according to another aspect of the invention.

FIG. 5 shows the wheel strut which is another aspect of the invention. The wheel strut 100 comprises a splined shaft 101, at the one side provided with a spline 102 and at the other side provided with driving means 103 for rotating the splined shaft 101. The driving means preferably consist of an electro motor 103. The splined shaft 101 is rotatably situated in a spline housing 104. At the bottom side said spline housing 104 is provided with accommodation means 105 for a wheel shaft 106. The spline housing 104 is at least partially accommodated in a sleeve 107 provided with attachment means 108 for mounting the wheel strut 101 to a vehicle. The spline housing 104 and the sleeve 107 are spring-mounted to each other by means of a spring 109. The housing of the electro motor 103 is connected to the sleeve 107. The spline housing is provided with a shaft receiving sleeve 105 for a shaft which is positioned substantially perpendicular to the spline housing. The shaft receiving sleeve 105 is fixedly attached to the spline housing 104.

The spring 109 is meant to buff the movement of the part spline shaft-sleeve with respect to the part spline housing-shaft receiving sleeve.

The sleeve 107 is provided with attachment means 108 for attaching the wheel strut 100 to a vehicle. The attachment means 108 are formed by a support 108 which is a permanent part of the structure and which is attached to the chassis or the structure with 2 conical pins and in that way forms one unit with the chassis or the structure of the vehicle.

In order to protect the spring 109 from outside influences it is enveloped by a distance sleeve 112 which at its upper side is attached to sleeve 107. Said distance sleeve 112 consists of two parts and is provided with small air outlet openings which buff the springy action of the suspension like a shock absorber. They also serve as an end stop in case the vehicle is lifted with its wheels from the ground. The lower part of the distance sleeve 115 is slid into the upper part 113. The distance sleeve members 115 and 113 are closed off of one and other with the help of a quadring 114.

In order to rotate a wheel electro motor 103 is activated. The rotation of the electro motor 103 is transmitted to splined shaft 101. The rotation of the splined shaft is transmitted to spline housing 104, as a result of which the wheel receiving sleeve attached to it rotates and a steering movement can be made. The electro motor can be provided with a transmission. The wheel strut is also provided with control and operating means for the electro motor. Additionally the wheel strut is provided with a so-called encoder which records the angular position of the wheel attachment means with respect to the vehicle attachment means. The wheel strut is also internally provided with data communication means, preferably optical data communication means. The encoder supplies operation information to the operating means of the wheel strut. The splined shaft 101 can also move up and down in the spline housing, as a result of which springing becomes possible. The vehicle attachment means can as a result move along the longitudinal axis with respect to the wheel attachment means.

The spline housing 104 is the part of the wheel suspension that rotates and moves up and down. A wheel can be attached to the spline housing 104 by means of a B5 standard flange. A brake device can be also mounted to the rear side by means of the central shaft 612/106. The central shaft 612/106 can also be equipped with a flange on which a wheel in neutral can be attached whereas on the other side disc brakes can be mounted. When the wheel according to the invention is mounted this part can be left out.

The triangle support is a point of adhesion for a triangle. Said triangle is available on the market and makes it possible to increase the load of the spring leg from 1500 kg allowed load bearing capacity to 4000 kg allowed load bearing capacity. By using the triangle bending forces are no longer exerted on the suspension.

An extended central shaft of a wheel according to the invention is necessary for the mounting of a wheel and may also serve to mount discs of a brake system.

The spring ensures a comfortable road holding of the vehicle on which the wheel and the suspension have been mounted. In the 4 ton version with triangle the spring is indeed completely pressed in but ensures a minimal spring pressure of 1500 kg when the vehicle is positioned inclined and one of the wheels threatens to come off the ground.

The rubber O-ring ensures the buffering of the spline housing 104 in the unlikely event of the load becoming so high that the spline housing 104 bumps against the support.

Description of the Electronic Control for Operating the Synchronous Motor in the Wheel According to the Invention.

The electronic control for the wheel according to the invention is built up modularly from several elements. The several elements are hierarchically adjusted to each other. The following elements can be distinguished.

1. Power Modules

At the lowest step IGBT main current modules have been used. The structure present in said IGBT main current modules renders them highly reliable in themselves already and guarantees a low heat emission and an optimal efficiency. The main current modules control the current through the windings. The windings are divided into three groups, each having another phase. Per winding there are two main current modules. The main current modules are driven by a higher step, namely:

2. Current Regulators

At the second step 2 IGBT main current modules are connected to a current regulator and driven by the current regulator. Together with a separate current sensor working according to the Hall principle (Hall sensor) they form an independent end step that controls the current in the accompanying motor winding. In this step the module and the current regulator are already galvanically separated from the operating electronics. A current regulator having two main current modules and Hall sensor are further called 4Q-modules. The main current modules with current regulator form a control system. There is a control system per winding.

3. Vector Generator

The vector generator supplies an operating value to the so-called 4Q-modules (step 1 and 2), which thus generate a magnetic field vector by means of windings of the synchronous motor and thus determine the moment of torque.

A so-called encoder or resolver, a measuring apparatus that very accurately measures the angle or the number of revolutions, makes the present position of the rotor with respect to the stator known to the vector generator. The quick calculation of the rotor position, which is derived from the sine/cosine signals of the resolver and the feedback value connected to it, ensures an optimal setting of the field vectors of the motor together with programmable logic modules, the so-called FPGA's.

The entire function of the vector generator, due to the combination of a micro processor and the FPGA's, can be programmed entirely over an optical fibre cable. This means that new data or changes needed for a special use can immediately be implemented (by telephone or Internet) in the wheel according to the invention that is already in operation. Said changes do not only regard the software of the FPGA's, but also the hardware of the modules. It is for instance possible to change the relation in the motor itself when a winding or a module should fail so that the wheel can remain functioning. The vector generator forms the operating system. The encoder and the Hall sensors with the accompanying electronics in the described embodiment form the measuring system.

4. CPU or Central Processing Unit

The first three stages are housed together in the wheel. The CPU is situated outside the wheel and communicates with the several wheels according to the invention that may be present on a car, by means of an optical ring data bus line (ORDABUL). It is also able to carry out calculations needed for the AGV's (automatic guided vehicles) regarding the road covered, odometrics when taking bends and diagnosing the complete driving concept. Each stage guards and reports the data important for the operational situation to the CPU. An error report is immediately reported to the stage above and this one immediately reacts by taking the necessary measures, before damage may arise. The stage above is able to activate an emergency program, which reacts to the error in the correct manner. As a result an error in one module hardly influences the entire vehicle.

The modular system makes it possible to make a simple error diagnosis and to quickly locate the relevant components without having to subsequently perform complex adjusting or setting activities.

An important difference with the usual control of Asynchronous/synchronous motors is the fact that in a preferred embodiment all motor windings are divided into three groups, each preferably consisting of 30 independent windings, electrically separated from each other and each winding being driven by its own 4Q-module. Here the 4Q-modules are merely connected to each other by means of the power supply voltage, as a result of which the following advantages arise:

1: Only two phases of the normal 3-phase drive are guarded and controlled. The currents in the third phase are calculated from the behaviour of the other two phases. This means a much greater freedom in operating the electronics, and for instance in buffering the failure of one or more modules.

2: The current distribution can be adjusted exactly so that each motor winding generates the same field strength. As a result the actual moments of torque in each winding, generated by the field, can be adjusted and are independent from the irregularities in the electric variables of the separate windings.

3: The magnetic tolerances of each winding can be calibrated separately by means of the vector generator.

4: When a 4Q-module fails or one of the windings has short circuited, the motor can still remain operational. A fuse or relay is able to separate the defect module or phase of the other 2 4Q-modules or phases without influencing them. In this way the motor is still able to brake or, when several wheels are used, to support them. The advantages of a stage-wise structure come to the fore here in particular.

Figure 6:
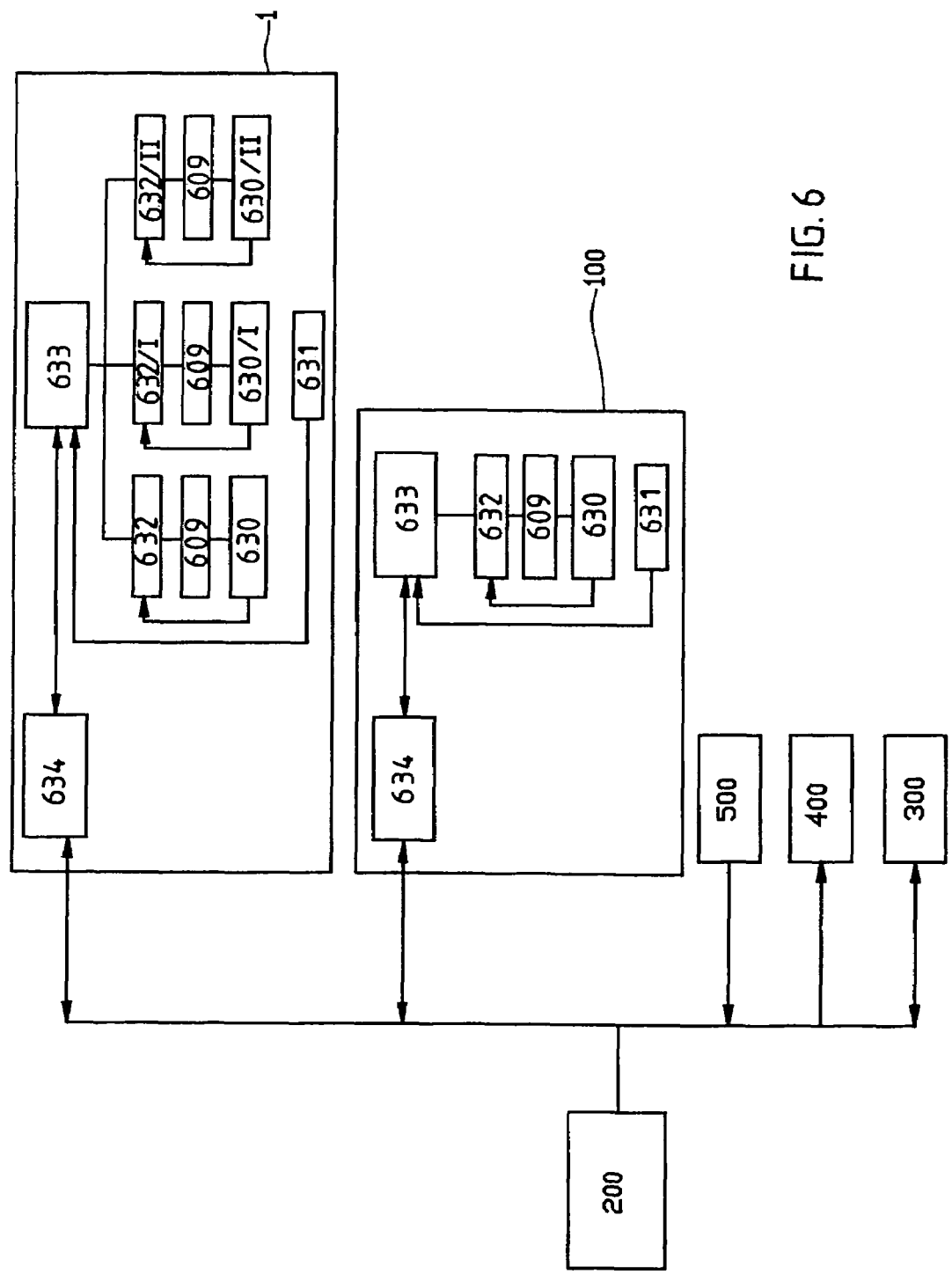
FIG. 6 shows a diagram of a control and operating system of a wheel according to the invention.

The functionality of the electronics described and their connection is further elucidated in FIG. 6. By means of a block diagram the connection is schematically shown here and the hierarchy of wheels, wheel struts and other control and operating means in an electrically driven vehicle, such as for instance a remote or automatically controlled vehicle. A central processing unit or computer 200 controls the overall exchange of data between the several parts, and ensures the possible automatic control of the vehicle. The computer 200 is connected to energy management system 300, namely the batteries, possible generators, fuel cells or solar panels, by means of data communication lines, for instance optical data communication lines. Additionally the computer 200 is connected to a display screen 400 on which the data are presented regarding the status of the various systems. The central computer 200 is also connected to various sensors that supply information regarding the vehicle position, possible obstacles, inside climate, and the like. The central computer moreover is connected to for instance two or more wheel struts 100 according to the invention. The numbers in the figure here correspond to the parts already described.

The central computer 200 is moreover connected to at least one or more wheels 1 according to the invention. It can be seen that the wheel comprises three groups of windings 609, 609/1 and 609/11, control systems 632, 632/1 and 632/11 for each group, and measuring systems 630, 630/1 and 630/11 for each group. Additionally the wheel comprises the already described encoder 631, which supplies data regarding the relative position of the rotor with respect of the stator to the operating system 633 superior to it. In the figure the three groups of the preferably in total at least 630 windings 609, 609/1 and 609/11 in a wheel 601 according to the invention are shown. The windings 609 are preferably divided into three groups, each having another phase $\phi^1$, $\phi^2$ and $\phi^3$. The current through each group of windings 609, 609/1 and 609/11 is measured by a Hall sensor 630. The value measured is passed on to the control system 632. The control system 632 controls the current through a group of windings by means of 2 IGBT's. The control systems 632 are operated by an operating system 633. Said operating system also receives data from an encoder 631, which supplies angle information about the rotor with respect to the stator. As a result the operating system 633 is capable of choosing a good phase setting for an optimized working. The operating system 633 is coupled to a central processing unit 200 in a vehicle by means of data communication means 634, preferably suitable for optical data communication.

Figure 7:
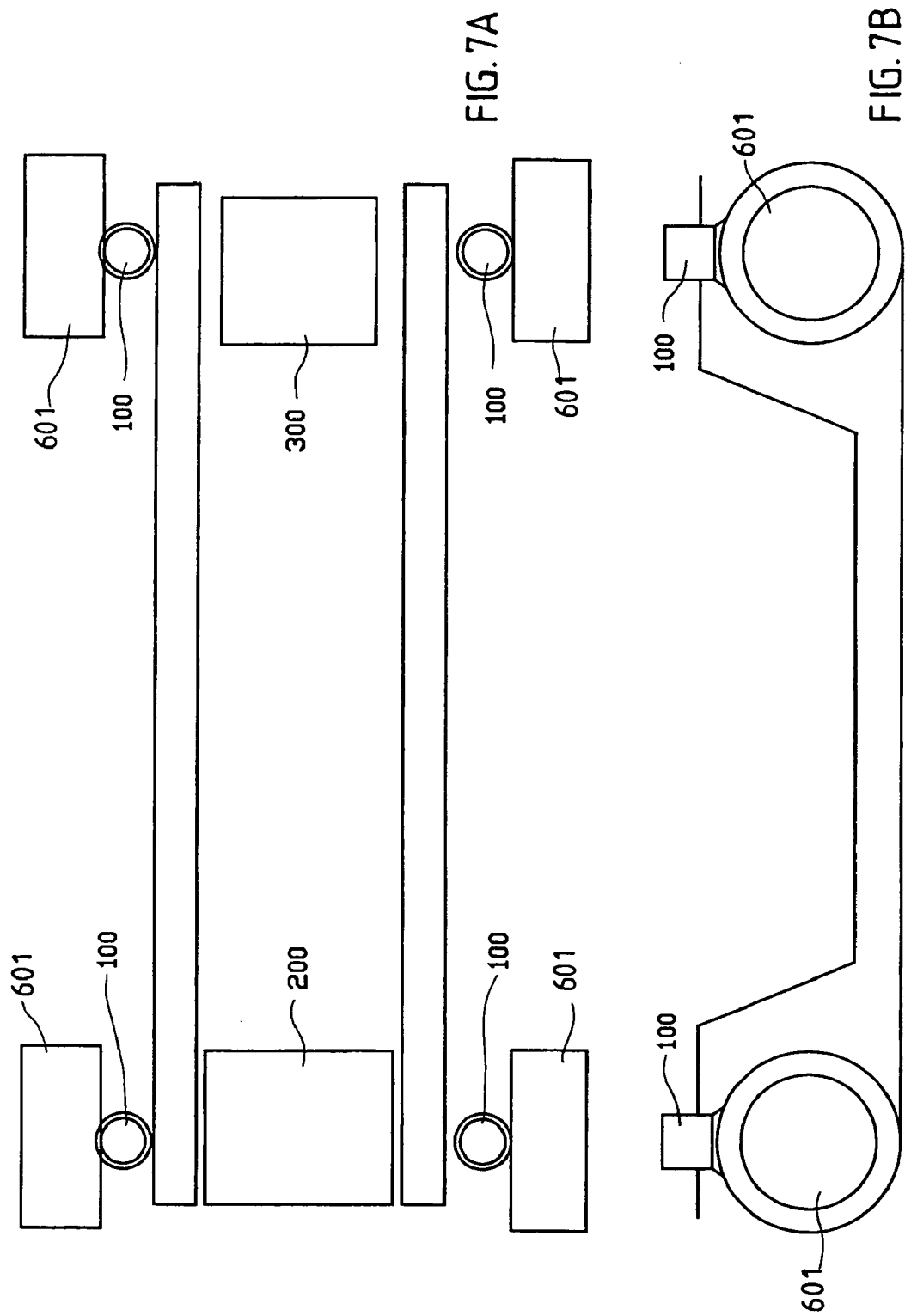
FIG. 7A shows a top view of a vehicle having wheels and wheel struts according to the invention.
FIG. 7B shows a top view of the vehicle of FIG. 7A.

FIG. 7A shows a top view of a vehicle provided with four wheels 601 according to the invention. Said wheels 601 are each attached to a wheel strut 100 according to another aspect of the invention that has also been described. Said wheel struts are each provided with means in the wheel strut as a result of which each wheel is able to rotate and in which way it is possible to drive the vehicle. The vehicle is furthermore equipped with a central processing unit 200 and batteries and control systems 300 for them. In FIG. 7B a side view of the vehicle of FIG. 7A is shown.

Figure 8:
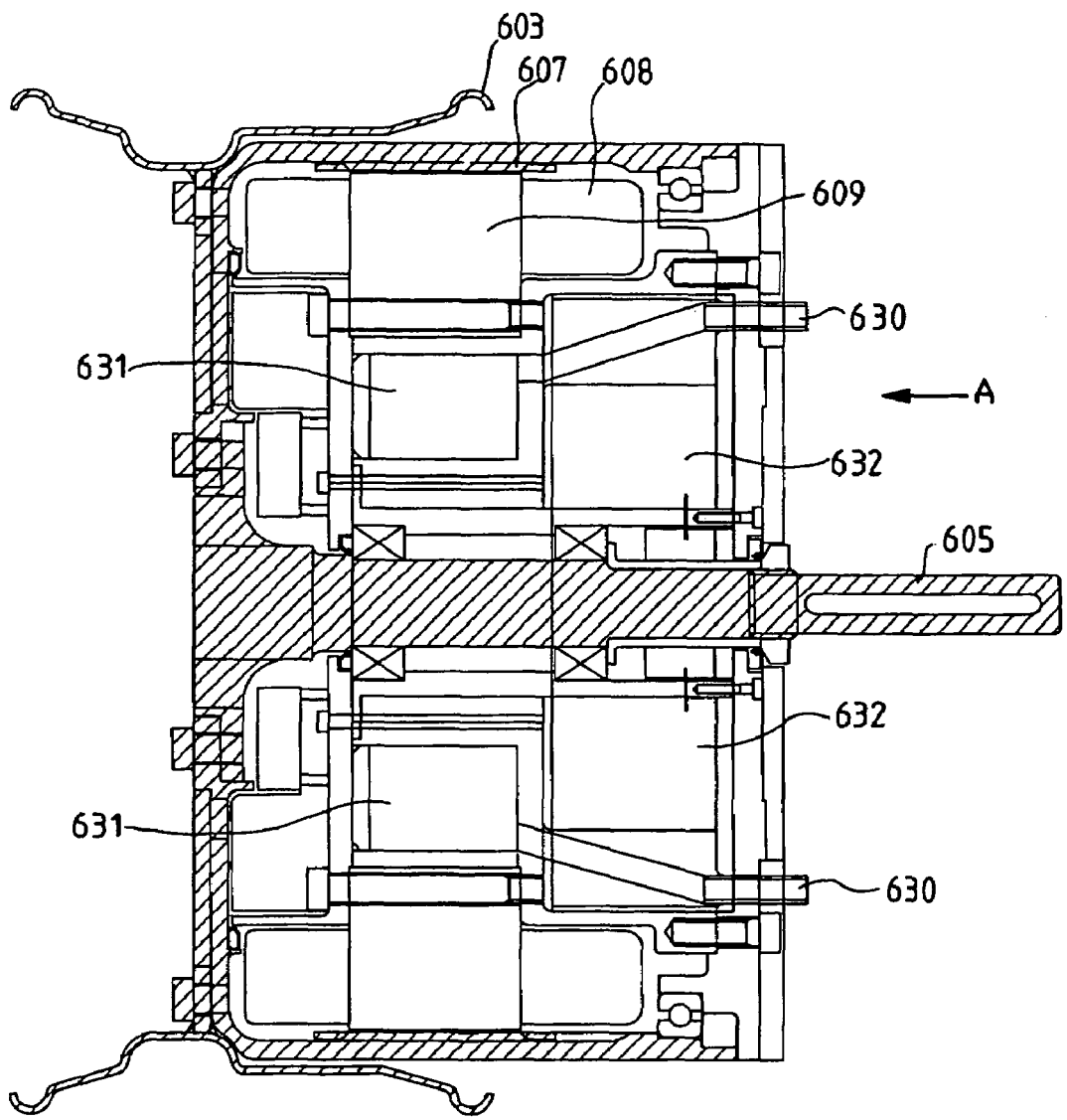
FIG. 8 shows an alternative embodiment of a wheel according to the invention.

FIG. 8 shows an alternative embodiment of the wheel according to the invention. The reference numbers correspond as much as possible to those in FIGS. 1 and 2. The vehicle side is shown with arrow A. The wheel according to FIG. 8 is provided with for instance water cooling. The inlet and outlet, respectively, of the cooling liquid is indicated by number 630. The inlet and outlet 630 flow out into a space 631 around the shaft through which cooling liquid circulates. In this embodiment the measuring, control and operating means have been arranged in space 632. The electronics are arranged with the print plates oriented towards a vehicle. The cooling liquid, preferably water, mainly serves to cool the windings.

Figure 9:
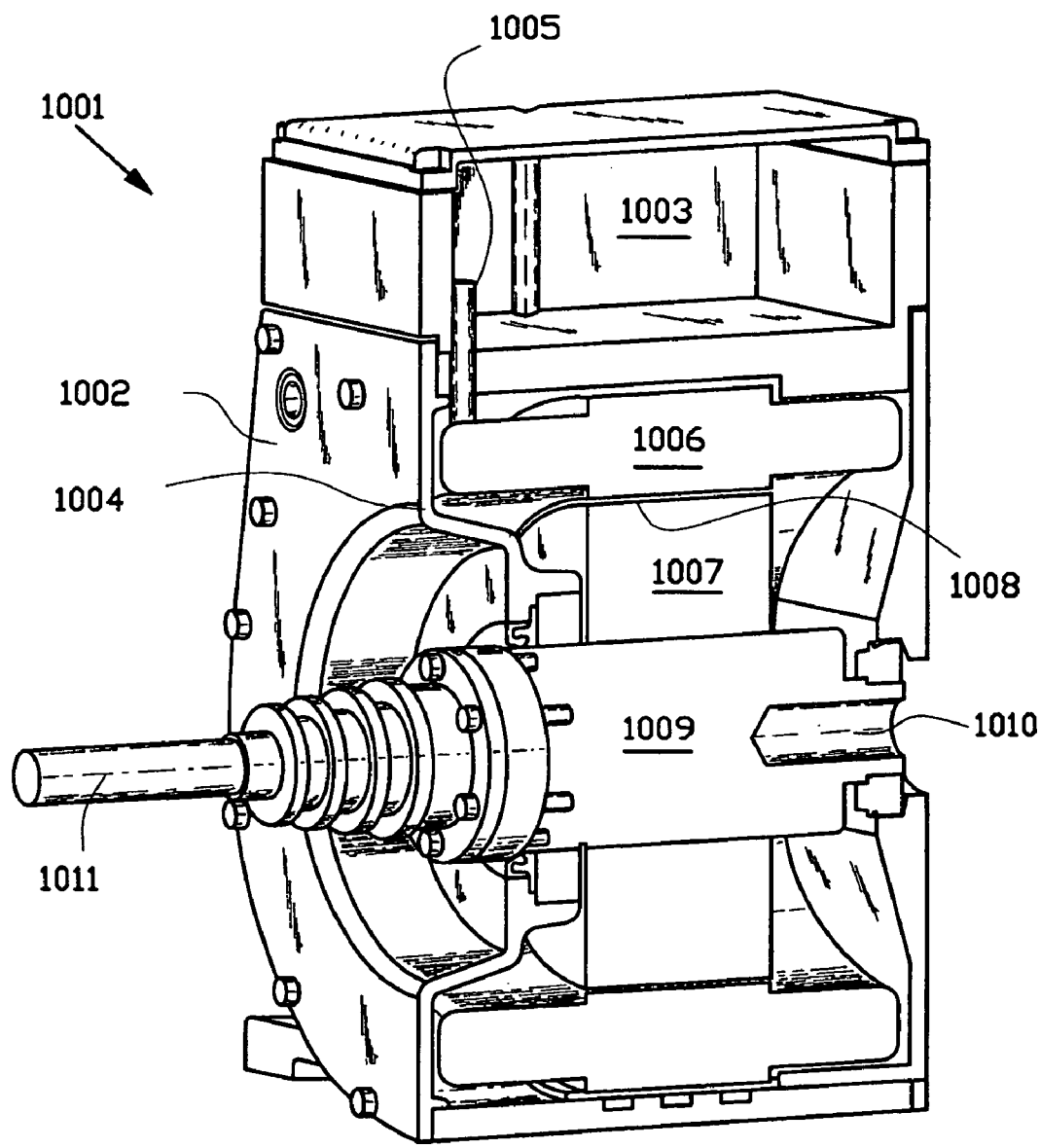
FIG. 9 shows an electric motor according to the other aspect of the invention.

In accordance with a further embodiment, FIG. 9 shows an electromotor 1001 provided with a housing 1002 which is subdivided into a first compartment 1003 for operation and control means and a second compartment provided with the actual electromotor and a passage for cables 1005 for the supply of measurement data to the electronics in compartment 1003. In one embodiment, housing 1002 is positioned outside of a wheel.

The electromotor is provided with windings 1006 which in the motor compartment of the electromotor are attached to the housing. The electromotor is furthermore provided with a rotor 1007, rotatably mounted in the motor section of the housing and coaxial to the stator windings 1006. The rotor is provided with permanent magnets 1008.

To connect two or more electromotor, the housing is provided with means for connecting housings with each other.

Furthermore, the axial ends of the rotor are provided with means for drivingly connecting the rotor with rotors of further of these electromotors. The rotor can for instance be provided with a hole which runs axially through the entire rotor. A long shaft which can run through all the rotors can than be used to interconnect the rotors. This shaft can be provided with a cam, working together with recess in the hole for rotating the shaft together with the rotor.

In particular, the rotor is provided with a rotor shaft 1009 provided with a bush 1010 in which a shaft end can be accommodated to operationally connect it to the rotor shaft, and at the other end of the shaft attachment means for connecting a homokinete 1011 to the other end of the rotor. The housing 1002 is furthermore provided with attachment means to attach a similar housing to this housing. When subsequently the electronic components, particularly the data communication means, are connected to each other, functionally one single electromotor is created. The data communication means transmit and receive digital data, optically, wireless or through a wired network. The data communication means for instance communicatie using the TCP/IP protocol. Two or more connected electromotors operate as described above for two or more wheels with the motor inside the wheel. The motors operate as if part of a network, in which one motor is the master and the other ones are slave units.

Figure 10:
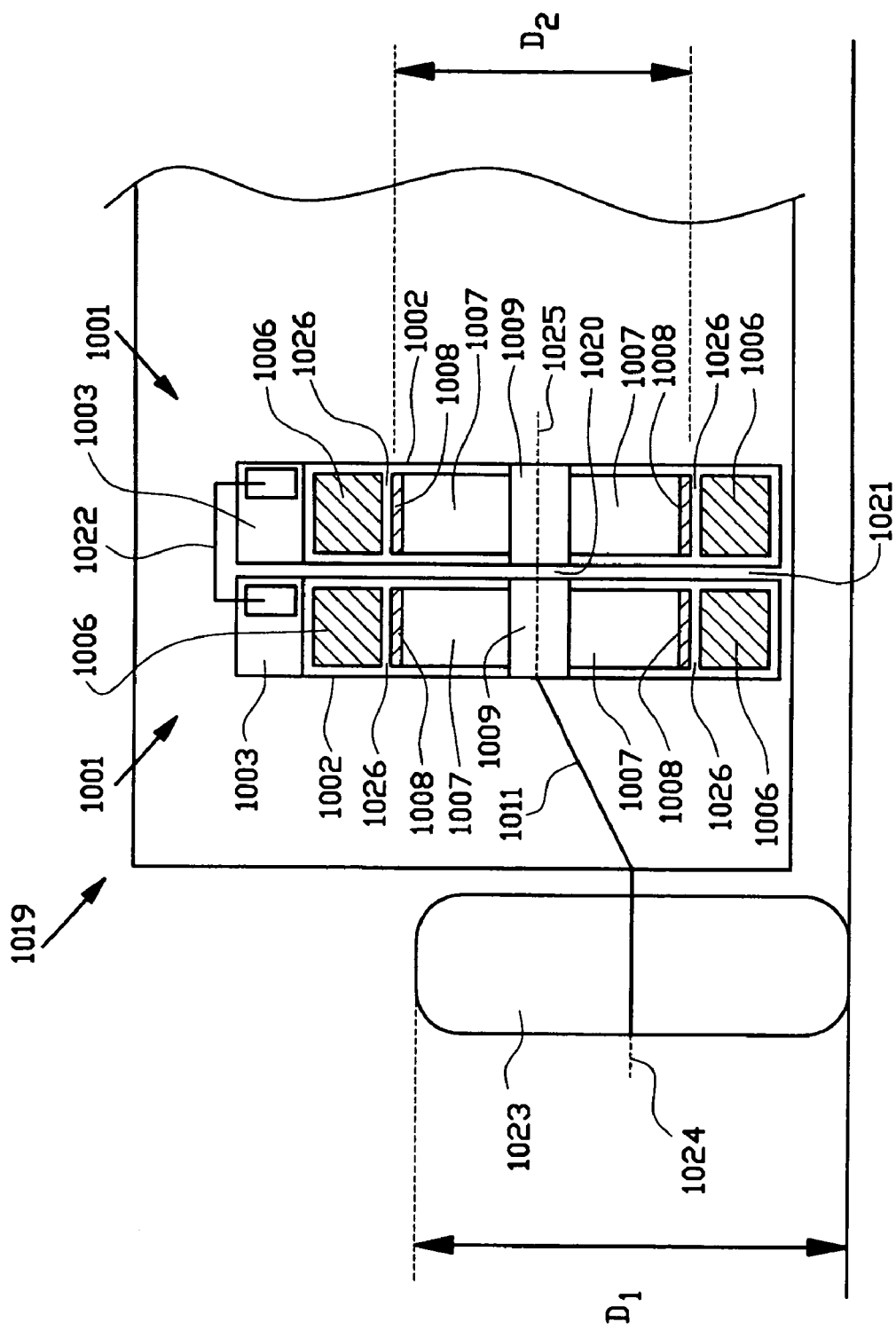
FIG. 10 shows a traction assembly using the electric motor of FIG. 9.

FIG. 10 shows a part of a vehicle 1019, here provided with two electromotors 1001 as described in FIG. 9, which are operationally connected one to the other by means of a connection shaft 1020. The electronics for the operation of both electromotors are connected one to the other by means of connection 1022. The data communication means are interconnected in order to allow the means for operating and means for controlling to function as one single unit. By means of a shaft 1011 provided with two flexible bending points, for instance homokinete or double homokinete, the motors are connected to a wheel 1023 provided with a wheel shaft 1024. The wheel has a diameter D1. The air slit 1026 here has a diameter D2. Due to the setup shown here it is possible to choose an air slit diameter that is very large in comparison to the diameter of the wheel, the diameter of the air slit D2 may even be larger than the diameter D1 of the wheel. As a result of this manner of direct driving, very large energy gain can be achieved. Due to the connecting of two electromotors as described here, it is possible to make a drive that is able to make use of standard electromotors. Said electromotors are described in FIG. 9. For instance a lightweight passenger car can be equipped with an electromotor according to FIG. 9 on either side at a wheel, and for instance a truck or a larger passenger car can be equipped with two mutually connected electromotors per wheel as shown in FIG. 10.

The electronic control for the electromotor according to the invention is modularly built up from several elements. The various elements are hierarchically adjusted to each other. These elements are functionally identical to the ones described above for the motor in the wheel.

It will be clear that the above description was merely included to illustrate the working of an exemplary embodiment and not to limit the scope of protection of the present patent application. Variations and embodiments of the embodiments elucidated in the description above that are evident to an expert are also a part of the scope of protection of the present invention.

I claim:

1. A modular traction assembly that drives a wheel of a vehicle, comprising a first electromotor assembly coupled to a second electromotor assembly:

said first electromotor assembly comprising:
- a first electromotor that directly drives the wheel of the vehicle, said first electromotor positioned outside of the wheel, said first electromotor having a first housing;
- a first stator connected to the first housing and comprising at least two groups of physically separated first windings;
- a first rotor, coaxially and rotatably mounted with the first stator and comprising permanent magnets, wherein the first stator is stationary with respect to an axis of rotation of the first rotor during operation of the first electromotor;
- a first controller that controls electric current in the first windings; at least one first measurement tool that measures an angular position of the first rotor with respect to the first stator;
- first operating means, connected to the first controller and the at least one first measurement tool, for operating the first electromotor, and
- first data communication means, connected to the first operating means, for communicating data to outside the first housing;

said second electromotor assembly comprising:
- a second electromotor that directly drives the wheel of the vehicle, said second electromotor positioned outside of the wheel, said second electromotor having a second housing;
- a second stator connected to the second housing and comprising at least two groups of physically separated second windings;
- a second rotor, coaxially and rotatably mounted with the second stator and comprising permanent magnets, wherein the second stator is stationary with respect to an axis of rotation of the second rotor during operation of the second electromotor;
- a second controller that controls electric current in the second windings; at least one second measurement tool that measures an angular position of the second rotor with respect to the second stator;
- second operating means, connected to the second controller and the at least one second measurement tool, for operating the second electromotor, and
- second data communication means, connected to the second operating means, for communicating data to outside the second housing;

wherein the first rotor has a bush that receives an end of the second rotor, whereby the first and second rotors are coupled such that the axis of rotation of the first rotor during operation of the first electromotor is identical to the axis of rotation of the second rotor during operation of the second electromotor;

wherein the first housing has an attachment means for coupling the first housing to the second housing;

wherein the first data communication means exchanges data with the second data communication means so that the first electromotor assembly and the second electromotor assembly function as a single electromotor for propelling the vehicle; and wherein the vehicle is self-propelled by the traction assembly.

2. The traction assembly according to claim 1, wherein the at least one first measurement tool comprises at least two means for measuring a magnetic field, arranged between two permanent magnets.

3. The traction assembly according to claim 1, wherein one axial end of the first rotor comprises the bush and a second axial end of the first rotor comprises a driving shaft adapted to be received in a further bush of a rotor in a further electromotor assembly.

4. The traction assembly according to claim 1 wherein the first rotor is enclosed completely within the first housing.

5. The traction assembly according to any one of claims 1-3, wherein the first operating means have a so-called master and slave setting, wherein the first operating means can be converted from a so-called master into slave setting, and vice versa, influenced by either the demand for power, the speed of rotation of the first rotor or via the first data communication means.

6. The traction assembly according to any one of claim 3, wherein the end of the second rotor received in the bush is provided with a homokinete.

7. The traction assembly according to claim 5, wherein the first electromotor is set as so-called master and at least the second electromotor is set as so-called slave.

8. A method for driving a wheel of a vehicle, comprising:
- directly driving the wheel of the vehicle with a modular traction assembly comprising a first electromotor assembly positioned outside of the wheel and a second electromotor assembly positioned outside of the wheel, wherein the first electromotor assembly is coupled to the second electromotor assembly, said first electromotor assembly being substantially enclosed in a first housing; said second electromotor assembly being substantially enclosed in a second housing;
- providing a first stator connected to the first housing and comprising at least two groups of physically first separated windings;
- providing a second stator connected to the second housing and comprising at least two groups of physically separated second windings;
- providing a first rotor, coaxially and rotatably mounted with the first stator and comprising permanent magnets, wherein the first stator is stationary with respect to an axis of rotation of the first rotor during operation of the first electromotor;
- providing a second rotor, coaxially and rotatably mounted with the second stator and comprising permanent magnets, wherein the second stator is stationary with respect to an axis of rotation of the second rotor during operation of the second electromotor; wherein the first rotor has a bush for receiving an end of the second rotor;
- coupling the first rotor to the second rotor by inserting the end of the second rotor into the bush, whereby the first and second rotors are coupled such that the axis of rotation of the first rotor during operation of the first electromotor assembly is identical to the axis of rotation of the second rotor during operation of the second electromotor assembly;
- attaching the first housing to the second housing;
- communicating data from the first electromotor assembly to outside the first housing;
- communicating data from the second electromotor assembly to outside the second housing;
- controlling electric current in the first windings; and controlling electric current in the second windings;
- measuring an angular position of the first rotor with respect to the first stator;
- measuring an angular position of the second rotor with respect to the second stator;
- transmitting data communicated from the first electromotor assembly to the second electromotor assembly; and transmitting data communicated from the second electromotor assembly to the first electromotor assembly;

operating the first electromotor assembly in accordance with the controlled electric current in the first windings and the measured angular position of the first rotor with respect to the first stator; operating the second electromotor assembly in accordance with the controlled electric current in the second windings and the measured angular position of the first rotor with respect to the second stator; wherein the first electromotor assembly and the second electromotor assembly function are operated as a single electromotor for propelling the vehicle; and wherein the vehicle is self-propelled by the first electromotor assembly and the second electromotor assembly operating as a single electromotor.

* * * * *

UNITED STATES PATENT AND TRADEMARK OFFICE
CERTIFICATE OF CORRECTION

| | |
|---|---|
| PATENT NO. | : 7,533,747 B2 |
| APPLICATION NO. | : 10/795803 |
| DATED | : May 19, 2009 |
| INVENTOR(S) | : Adrianus Johannes Heinen |

It is certified that error appears in the above-identified patent and that said Letters Patent is hereby corrected as shown below:

On the title page, please amend item (63) as follows:

--(63) Continuation-in-part of application No. 10/619,926, filed on Jul. 15, 2003, now Pat. No. 7,530,415, which is a continuation-in-part of application No. 10/205,405, filed on Jul. 26, 2002, now Pat. No. 7,059,437, which is a continuation of International Appln. No. PCT/NL01/00054, filed on Jan. 26, 2001.--

On the title page, please amend item (30) as follows:

--(30)　　Foreign Application Priority Data

Jan. 26, 2000　(NL) .......................................................1014182

Mar. 7, 2003　(NL) .......................................................1022873

Oct. 17, 2003　(NL) .......................................................1024565--

In the Specification

In column 1, lines 4-17, cancel the paragraph appearing beneath the heading "CROSS-REFERENCE TO RELATED APPLICATIONS" and replace with the following:

--The present application is a continuation-in-part of U.S. Patent Application No. 10/619,926, filed July 15, 2003, now U.S. Patent No. 7,530,415, which is a continuation-in-part of U.S. Patent Application No. 10/205,405, filed July 26, 2002, now U.S. Patent No. 7,059,437, which is a Continuation of International Patent Application No. PCT/NL01/00054 filed January 26, 2001, which in turn claimed priority based on Dutch Patent Application No. NL 1014182, filed January 26, 2000. The present application also claims foreign priority Signed and Sealed this
Twentieth Day of October, 2015

Michelle K. Lee
*Director of the United States Patent and Trademark Office* based on Dutch Patent Application No. NL 1022873, filed March 7, 2003, and Dutch Patent Application No. NL 1024565, filed October 17, 2003.--